(12) United States Patent
Hansen et al.

(10) Patent No.: US 8,616,373 B2
(45) Date of Patent: Dec. 31, 2013

(54) RECLOSABLE DISPLAY PACKAGE AND METHOD OF USE

(75) Inventors: Victor D. Hansen, Rockford, MI (US); Elliott R. Eckert, Grand Rapids, MI (US); Martin O. Tidball, Rockford, MI (US)

(73) Assignee: Display Pack, Inc., Grand Rapids, MI (US)

( * ) Notice: Subject to any disclaimer, the term of this patent is extended or adjusted under 35 U.S.C. 154(b) by 238 days.

(21) Appl. No.: 13/228,541

(22) Filed: Sep. 9, 2011

(65) Prior Publication Data

US 2013/0062342 A1 Mar. 14, 2013

(51) Int. Cl.
*B65D 73/00* (2006.01)

(52) U.S. Cl.
USPC ............... 206/463; 206/470; 493/84

(58) Field of Classification Search
USPC ............ 206/461–471, 806; 53/452, 456, 467, 53/473; 220/4.22, 833; 264/319; 493/56, 493/84
See application file for complete search history.

(56) References Cited

U.S. PATENT DOCUMENTS

| | | | |
|---|---|---|---|
| 3,111,220 A | 11/1963 | Donald | |
| 3,279,596 A * | 10/1966 | Prym et al. | 206/469 |
| 3,327,843 A * | 6/1967 | O'Meara et al. | 206/532 |
| 3,464,544 A * | 9/1969 | Franck | 206/468 |
| 4,083,451 A | 4/1978 | Hair | |
| 4,266,666 A | 5/1981 | Kuchenbecker | |
| 4,319,684 A | 3/1982 | Backman et al. | |
| D263,684 S | 4/1982 | Davis | |
| 4,456,124 A | 6/1984 | Kay et al. | |
| 4,666,037 A | 5/1987 | Weissman | |
| 4,739,883 A | 4/1988 | Mohs et al. | |
| 4,842,141 A * | 6/1989 | Segal | 206/462 |
| D305,000 S | 12/1989 | Hernandez | |
| 5,092,479 A | 3/1992 | Wells | |
| 5,129,517 A * | 7/1992 | Hustad | 206/467 |
| 5,209,354 A * | 5/1993 | Thornhill et al. | 206/469 |
| D376,314 S | 12/1996 | Krupa | |
| 5,775,516 A | 7/1998 | McCumber et al. | |
| D407,015 S | 3/1999 | Jones | |
| D411,448 S | 6/1999 | Baker | |
| D420,905 S | 2/2000 | Adkins | |
| 6,053,321 A | 4/2000 | Kayser | |
| 6,230,964 B1 | 5/2001 | Saito | |
| 6,244,444 B1 | 6/2001 | Jacobus et al. | |
| D448,288 S | 9/2001 | Zettle et al. | |

(Continued)

OTHER PUBLICATIONS

Design Drawings dated Feb. 2, 2009, 15 pages.

*Primary Examiner* — Luan K Bui
(74) *Attorney, Agent, or Firm* — Warner Norcross & Judd LLP

(57) ABSTRACT

A reclosable package for packaging an article is provided with a plastic door component and a separate tray that cooperate to form an article containing cavity. The tray may be manufactured from a paper pulp material, such as molded pulp. The door component and tray may be installed between a pair of panels. The door component may include a door portion and a flange portion joined along a hinge. The flange portion may be sandwiched between the panels to hold the door component in place. The door portion may be movable about the hinge to allow the package to be opened and closed. The door portion may interface with the door panel in a way that resists movement of the door portion between the open position and the closed position. The door portion may include snap elements configured to have an interference fit with the door panel.

15 Claims, 15 Drawing Sheets

(56) References Cited

U.S. PATENT DOCUMENTS

| | | |
|---|---|---|
| 6,308,832 B1 * | 10/2001 | Pirro et al. .................... 206/469 |
| 6,364,115 B1 | 4/2002 | Casanova et al. |
| D479,127 S | 9/2003 | Jowett |
| D531,028 S | 10/2006 | Weiss et al. |
| D534,421 S | 1/2007 | Tanner |
| D553,489 S | 10/2007 | Lambert et al. |
| D600,113 S | 9/2009 | Edwards et al. |
| D601,014 S | 9/2009 | Petitjean |
| D606,392 S | 12/2009 | Prevost |
| D615,858 S | 5/2010 | Prevost |
| D624,399 S | 9/2010 | Hansen et al. |
| D624,402 S | 9/2010 | Hansen et al. |
| D624,403 S | 9/2010 | Hansen et al. |
| D624,815 S | 10/2010 | Hansen et al. |
| 7,931,148 B2 * | 4/2011 | Hansen et al. ................ 206/470 |
| 2002/0195363 A1 | 12/2002 | Tuneberg |
| 2008/0118609 A1 | 5/2008 | Harlfinger |
| 2011/0290675 A1 * | 12/2011 | Shiue et al. ................... 206/471 |

* cited by examiner

# RECLOSABLE DISPLAY PACKAGE AND METHOD OF USE

BACKGROUND OF THE INVENTION

The present invention relates to packaging, and more particularly to point-of-sale product packages.

A wide variety of products intended for retail sale are packaged in packaging that includes plastic components. One of the most common forms of plastic point-of-sale packages is a blister package. A typical blister package includes a shaped plastic blister that forms the main cavity of the package and a backer panel that closes the cavity. The backer panel is often sealed to the blister, for example, by adhesive to enclose the product within the cavity. The backer panel may be formed from paperboard, plastic, aluminum or other similar materials. Because of the use of a paperboard backer panel, a blister package has the potential to be a relatively low cost packaging solution. The amount of plastic used to contain the product is relatively small and the backer panel can be sized to provide ample space for printed content.

Another common form of plastic point-of-sale package is a clamshell package. A typical clamshell package includes a pair of formed plastic parts (often "halves") that are joined along a hinge. The parts can be closed about the hinge to entrap the product to be packaged. Clamshell packages vary dramatically in design and configuration. For example, some clamshell packages are sealed shut to protect the contents of the package until it is opened, while other clamshell packages are resealable. With sealed clamshell packages, it is often necessary to at least partially destroy the package to gain access to the contents. In a resealable configuration, the clamshell can be formed with contours that permit the two clamshell parts to be friction interfitted in a way that holds the parts together in a closed configuration about the packaged contents. It is not uncommon to incorporate paper or paperboard inserts into clamshell packages. For example, information and other content can be printed on an insert that is enclosed within the clamshell.

In some applications, a hybrid clamshell package is formed by securing paperboard panels or other similar materials around the peripheral edges of the clamshell. The hybrid package provides, among other things, the added advantage of additional space for additional printed content. Although it enjoys some benefits, the presence of the hinge in the clamshell presents a challenge to hybrid package construction. Conventional constructions provide two options for dealing with the hinge. In one type of construction, the hinge is trapped between the paperboard panels. This provides a strong package because the clamshell is joined to the paperboard around its entire periphery. However, because the hinge is positioned between the paperboard panels, opening and closing of the package forces the paperboard apart, which can cause the paperboard to buckle and tear near the hinge. This problem can be exacerbated with repeated opening and closing of the blister. The peeling and tearing of the paperboard can ultimately break the connection between the paperboard and the blister, which can weaken the package and impact its aesthetic appearance. The second type of hybrid construction includes paperboard panels that are shaped so that they do not entrap the hinge. This prevents the issues of buckling and tearing discussed above, but provides a somewhat weaker package because the clamshell and paperboard panels are not laminated along the hinge.

One particularly innovative solution that addresses the foregoing problems is shown in U.S. Pat. No. 7,931,148 to Hansen et al for DOUBLE HINGE DISPLAY PACKAGE AND METHOD OF USE, issued Apr. 26, 2011, which is incorporated herein by reference in its entirety. In one embodiment, U.S. Pat. No. 7,931,148 discloses a hybrid package that includes a reclosable plastic clamshell that is combined with a pair of paperboard panels. The clamshell may include front and rear parts that are joined by two hinges, including a manufacturing hinge and an operating hinge.

SUMMARY OF THE INVENTION

The present invention provides a reclosable display package having an articulating plastic component with a door portion that can be selectively opened and a flange portion that is sandwiched between a pair of panels. The door portion is joined with the flange portion along a hinge. The hinge may be positioned so that it remains exposed in the assembled package such that opening and closing of the door about the hinge does not place stress on the panels. In one embodiment, the door portion of the plastic component includes a shoulder configured to be fitted closely within an opening in a panel. The shoulder may include protrusions arranged to snap-lock with the panel when the door is in the closed position. The number and location of shoulder protrusions may vary. For example, shoulder protrusions may be located in all four corner of the door portion or in the free corners of the door portion (e.g. the corners opposite the hinge).

In one embodiment, the plastic component may include a peripheral lip configured to engage the face of a panel when the door portion is in the closed position. The lip may extend outwardly from the shoulder around the door portion on all sides, except the side that includes the hinge. The spacing between the lip and the shoulder protrusions may be greater than the thickness of a panel such that the panel may be received between the lip and the shoulder when the door portion is closed. The lip may include a tab to facilitate opening of the door portion. The tab may extend at angle so that it can be easily grasped by a user.

In one embodiment, the display package includes a tray configured to cooperate with the door portion to define an article container space. To reduce the use of plastic, the tray may be manufactured from paper fibers, such as a recycled paper pulp product. The tray may, however, be manufactured from other material (including plastic), if desired. In this embodiment, the package may include a door panel and a tray panel. The tray may include a body portion and a peripheral lip extending from the body portion. The lip may be configured to be sandwiched between the door panel and the tray panel. The door panel may define an opening that seats and receives the door portion when in the closed position. For example, the door panel may define an opening of the appropriate size and shape to receive the shoulder of the door portion. The tray panel may define an opening to receive the portion of the body portion of the tray that protrudes from the tray panel. In one embodiment, the shoulder is sized and shaped to extend entirely through the door panel and the tray panel. The body portion of the tray may be of sufficient size to receive the portion of shoulder protruding from the tray panel.

In one embodiment, the panels may be joined by a cohesive, such as a rubber cement or a latex-based cohesive. The cohesive allows the package to be easily assembled without expensive sealing equipment. Alternatively, the panels may be joined by other adhesives, such as heat activated adhesives. In applications that incorporate a cohesive, the flange of the plastic component may be specially shaped to facilitate use with cohesive. In one embodiment the flange includes "wings" that extend outwardly to increase the strength of the connection between the plastic component and the panels while maintaining a bond between the panels. In one embodiment, the hinge extends in a transverse direction across the plastic component and the wings extend in a transverse direction beyond opposite transverse ends of the hinge. The wings may be spaced from the hinge a sufficient distance to allow the panels to be joined together by the cohesive in the region between the hinge and the wings to resist removal of the wings out from between the panels.

In one embodiment, the package may include a hang hole and the flange may be configured to reinforce the hang hole. In this embodiment, the hang hole may be located toward the top of the package and the flange may be shaped to extend above the hang hole to reinforce the panels against tearing initiated at the hang hole. The flange may be shaped to extend completely around the hang hole, if desired.

In one embodiment, the door and tray panels are joined together along a living hinge. The door and tray panels may, however, be separate components.

In another aspect of the invention, a method is provided for forming a composite reclosable package with an articulating plastic component is secured between two panels. The plastic component includes a door portion and a flange portion that are joined along a hinge. In one embodiment, the method includes the steps of: (a) forming a plastic component with a door portion and a flange portion that are joined along a living hinge; (b) forming a first panel defining an opening configured to closely receive the door portion of the plastic component; (c) fitting the door portion into the first panel opening with the hinge exposed and the flange portion overlying a surface of the door panel; and (d) securing a second panel to the first panel to sandwich the flange portion between the first panel and the second panel.

The present invention provides a simple and inexpensive display package with a plastic component having a door that interlocks with a paperboard panel to hold the door in the closed position. The package is easily opened and closed by a consumer interested in gaining access to the packaged article(s). For example, the package allows a potential customer to inspect the packaged article(s) at the point of sale. It also allows a customer to more easily access article(s) once purchased. In those embodiments that include a paper pulp tray, the amount of plastic used in the package is reduced, which can be more environmentally friendly and lead to reduced cost. In those embodiments that use a cohesive to join the panels, the package can be more easily assembled without the need for expensive sealing equipment. The described advantages of a paper pulp tray and a cohesive are merely exemplary and are by no means the only benefits that can result from the paper pulp tray and the use of a cohesive. For example, a paper pulp tray may also provide a desired aesthetic appearance and a cohesive may reduce heat emissions in the packaging facility. Accordingly, the described benefits should not be interpreted to limit the invention in any way.

These and other objects, advantages and features of the invention will be more readily understood and appreciated by reference to the detailed description of the invention and the drawings.

DETAILED DESCRIPTION OF CURRENT EMBODIMENTS

Figure 1:
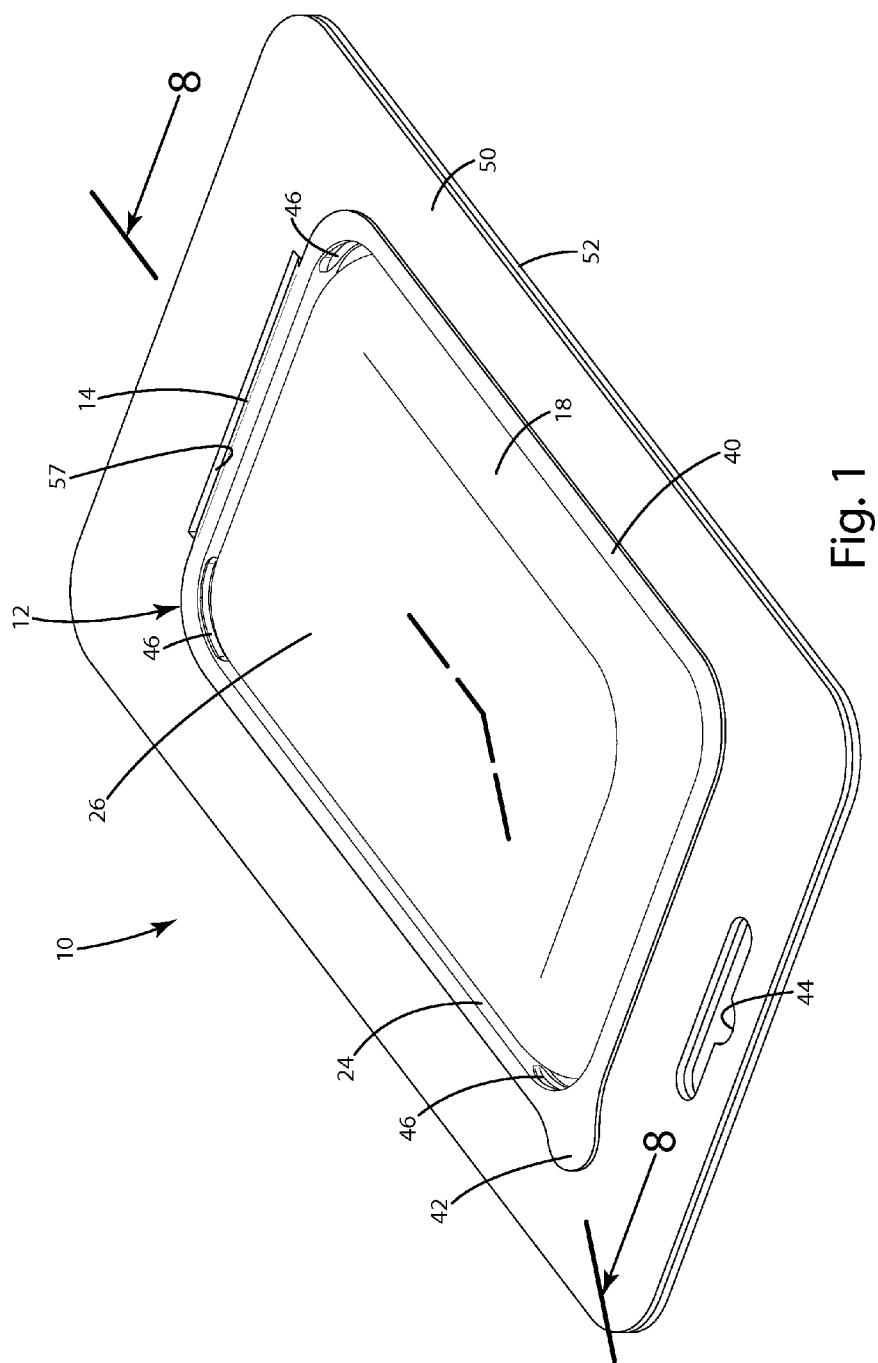
FIG. 1 is a perspective view of a package in accordance with an embodiment of the present invention.
Figure 2:
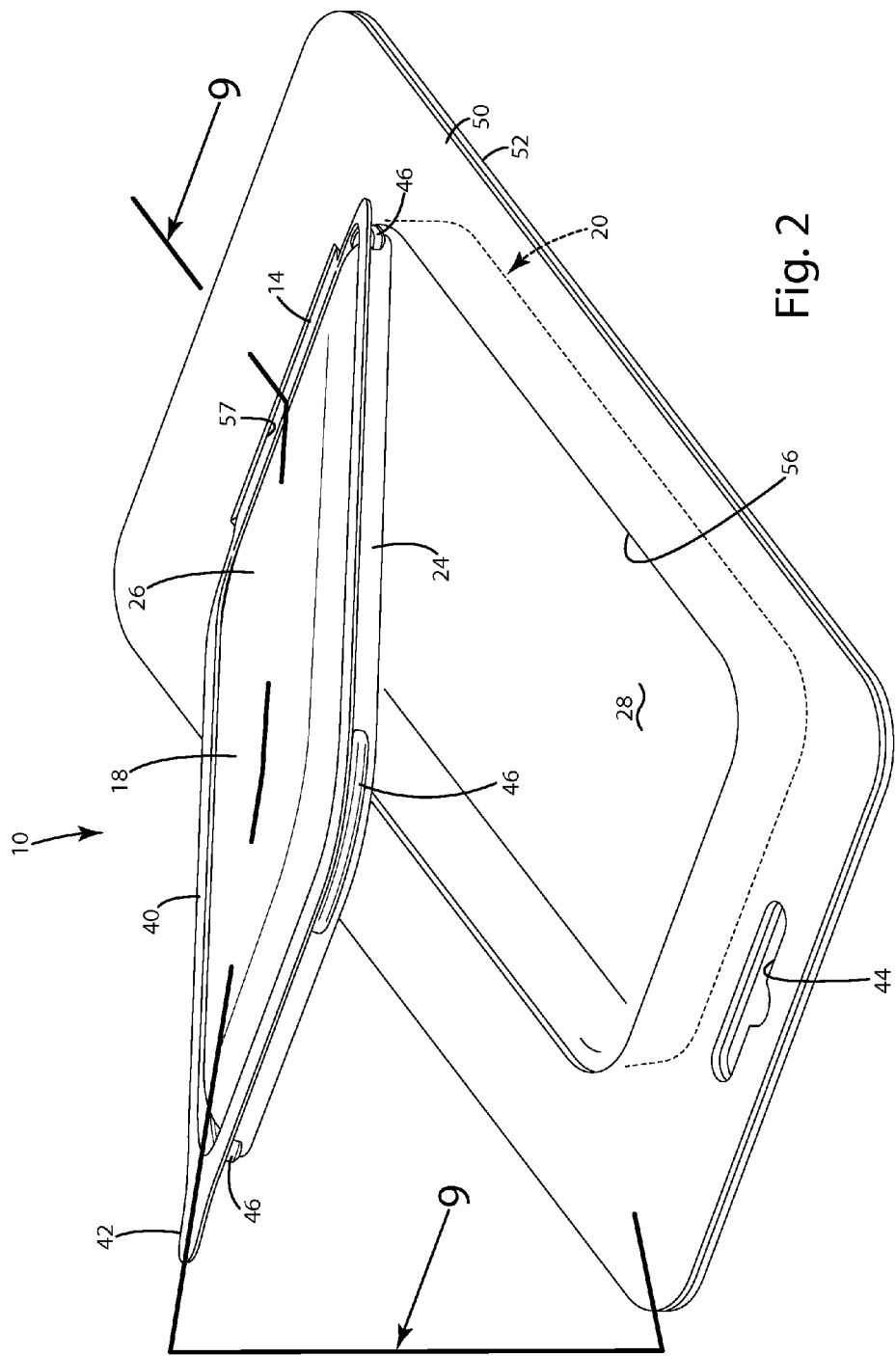
FIG. 2 is a perspective view of the package in an open position.
Figure 3:
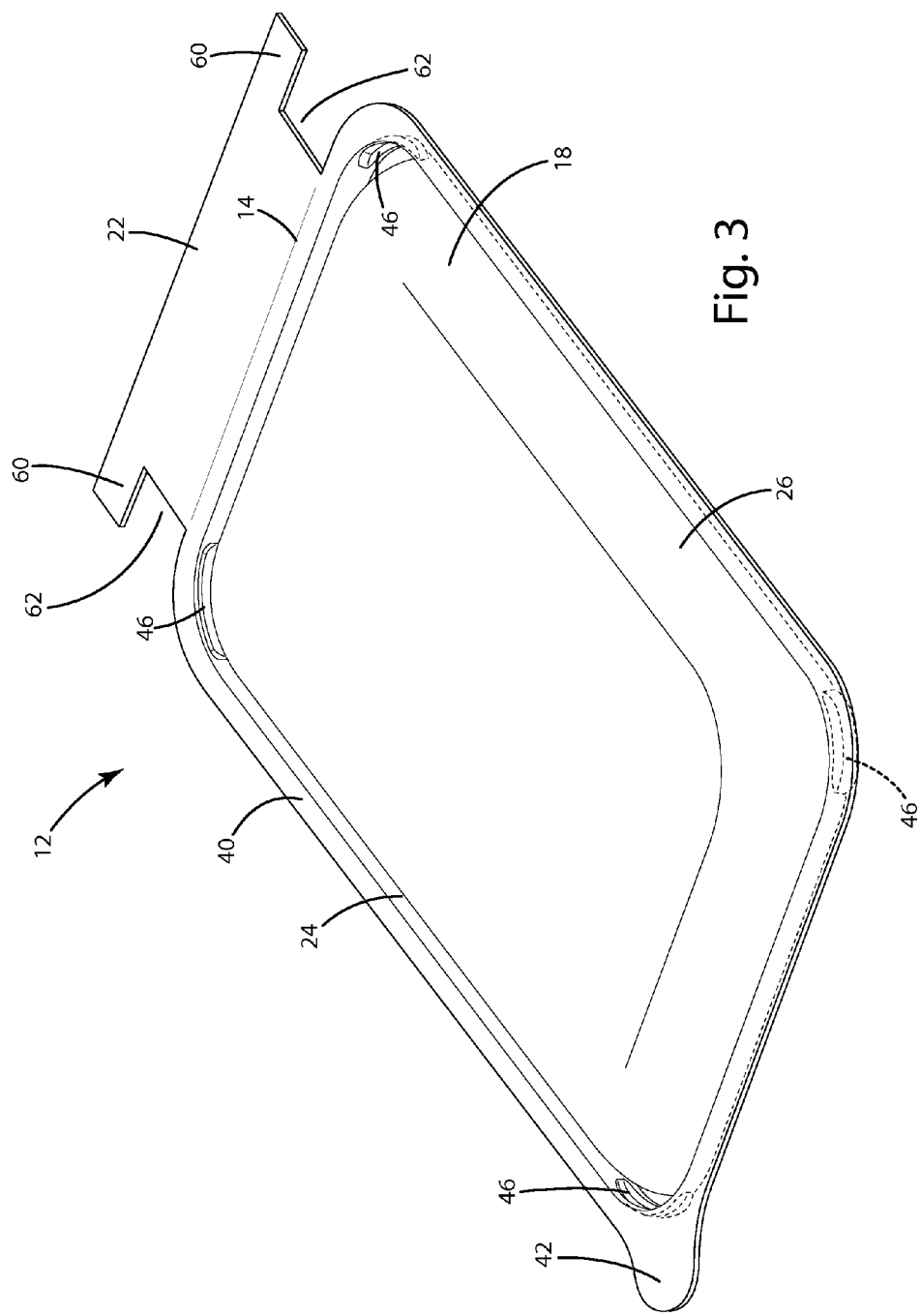
FIG. 3 is a perspective view of the plastic component.

A reclosable display package in accordance with an embodiment of the invention is shown in FIG. 1 and is generally designated 10. The reclosable package 10 is designed to hold and display articles for sale and generally includes a plastic component 12, a tray 20 and a pair of panels 50, 52. In the illustrated embodiment, the plastic component 12 and the tray 20 cooperate to form a cavity 13 adapted to contain the packaged article(s). The plastic component 12 includes a hinge 14 that divides the plastic component into a door portion 18 and a flange portion 22. The door portion 18 is configured to pivot about the hinge 14 between open and closed positions. The flange portion 22 is sandwiched between the panels 50, 52 to hold the plastic component in place. The tray 20 may include a peripheral lip that is sandwiched between the panels 50, 52. The tray 20 may be manufactured from a recycled paper pulp product. The panels 50, 52 may be part of a single paperboard component 24 that is divided into the panels 50, 52 by a fold line 54. If desired, the panels 50, 52 may be sealed over the plastic component 12 and tray 20 together using a cohesive applied to the inner surfaces of the panels 50, 52. When used, the cohesive permits simple manual assembly of the package 10 without sealing equipment.

Directional terms, such as "vertical," "horizontal," "top," "bottom," "upper," "lower," "inside," "inner," "inwardly," "outside," "outer" and "outwardly," are used to assist in describing the invention based on the orientation of the embodiments shown in the illustrations. The use of directional terms is merely an expedient to facilitate disclosure with reference to the illustrations and should not be interpreted to limit the invention to packages of any specific orientation(s).

As noted above, the package 10 includes a plastic component 12 that functions as a reclosable door. The plastic component 12 of the illustrated embodiment is generally rectangular, but it can be virtually any desired size and shape depending on the article to be packaged and on aesthetic considerations. In the illustrated embodiment, the plastic component 12 includes a door portion 18 and flange portion 22. The door portion 18 is shaped to form a pocket 26, which, when moved into the closed position, cooperates with the tray 20 (described below) to create the cavity 13. In this embodiment, the pocket 26 is generally rectangular in shape, with rounded corners. However, the door portion 18 and the pocket 26 can alternatively be round, oval or essentially any other suitable shape.

The door portion 18 of this embodiment is configured to selectively interlock with the door panel 50 (described in more detail below). The door portion 18 of the illustrated embodiment includes a shoulder 24 and a peripheral lip 40 that are shaped to interface with the door panel 50. More specifically, in the illustrated embodiment, the shoulder 24 and lip 40 corresponds in shape with the opening 56 in the door panel 50 so that, when the package 10 is closed, the shoulder 24 is closely received within the opening 56 with the lip 40 engaging the outer surface of the panel 50. The size, shape and configuration of the shoulder 24 may vary from application to application. However, in the illustrated embodiment, the shoulder 24 extends entirely around the door portion 18 and is of sufficient depth to extend through both panels 50, 52 and protrude from the opposite side of the package 10. Although continuous in the illustrated embodiment, the shoulder 24 may be discontinuous, if desired. In the illustrated embodiment, the shoulder 24 includes four snap elements 46 that snap fit with the door panel 50 to hold the door portion 18 in the closed position. The snap elements 46 of this embodiment are extensions or protrusions on shoulder 24 that provide an interference fit with the door panel 50. In the illustrated embodiment, the snap elements 46 include four protrusions generally positioned at the corners of the shoulder 24. By virtue of the interference fit, the snap elements 46 interact with the door panel 50 when the package 10 is opened or closed. The number of snap elements 46 may vary and they may be positioned in essentially any desired location on the shoulder 24. The characteristics of the snap elements 46, such as the number, location, shape and/or length of the snap elements, may be varied to provide the stiffness desired to maintain a snap-fit between the snap elements 46 and the door panel 50. For example, longer or shorter snap elements 46 may vary the overall force required to snap-fit the door portion 18 into the closed position. Further, the leading and closing edges of the snap elements 46 may be non-planar to provide some control over the interaction between the snap elements 46 and the door panel 50. For example, the leading edge can be ramped to provide less resistance when snapping the snap element 46 into engagement with the door panel 50. As another example, the trailing edge of the snap elements 46 can be squared to provide increased resistance to opening of the package. Alternatively, or additionally, the characteristics of the interfacing portions of the door panel 50, such as size or shape, may be varied to control the force required to operate the snap-fitting interaction of the snap elements 46 and the door panel 50. For example, the force required to open and close the door portion 18 may be varied by increasing or decreasing the closeness of the fit between the door panel 50 and the shoulder 24 and/or the snap elements 46, or by varying the thickness or characteristic of material of the door panel 50.

In the illustrated embodiment, the peripheral lip 40 extends around the periphery of the door portion 18, except along the hinge edge. The lip 40 is generally uniform in width, but it may vary in width, if desired. The peripheral lip 40 is configured to engage the outer surface of panel 50 when the clamshell 12 is in a closed position. Optionally, the peripheral lip 40 can include a tab 42 extending outward from the peripheral lip 40. The tab 42 can be pulled by a user to swing the door portion 18 away from the door panel 50 to open the package 10. The tab 42 may be sized and shaped to provide sufficient gripping surface for a user to overcome the resistance to opening created by the interaction of the snap elements 46 with the door panel 50. For example, the tab 42 can be sized so that it can be readily squeezed between a user's thumb and forefinger. As shown, the tab 42 is positioned at a corner of the lip 40, but the tab 42 may be positioned at any desired location on the lip 40.

The hinge 14 that connects the door portion 18 and the flange portion 22 can be any suitable type of connection that allows the two portions 18, 22 to move with respect to each other, such as a living hinge. For example, the hinge 14 can be a line of weakening extending transversely across the material of the plastic component, such that the door portion 18 and the flange portion 22 are integrally formed and fold at the line of weakening. The line of weakening could include a fold line, a score line, a line of reduced thickness or a line of perforations. Alternatively, the hinge may be a square hinge (not shown) or other type of hinge form by shaping the plastic material. The square hinge can be formed as a ridge or bump or protrusion in the plastic component, and may reinforce the plastic component 18 in the transverse direction. More specifically, the square hinge may be generally rigid in the traverse direction (e.g. along the length of the hinge), while allowing the plastic component 18 to easily bend or flex in the lateral direction. In this way, the square hinge may increase the strength and/or durability of the plastic component 18, which may enable the package 10 to be repeatedly opened and closed without failure of the hinge. If included, the square hinge may be facilitated by trim lines, die cuts, or other mechanisms generally know in the art.

The flange portion 22 of the illustrated embodiment is configured to be trapped between the panels 50 and 52. In this embodiment, the panel 50 and 52 are joined together by a cohesive. Because the cohesive adheres predominantly only to itself, the flange portion 22 may be shaped to improve the cohesive interconnection of the various components. For example, in the illustrated embodiment, flange portion 22 includes wings 60 that are spaced away from the hinge 14 to provide notches 62 for the panels 50 and 52 to cohesively adhere in a region that will resists removal of the flange portion 22 from between the panels 50 and 52. In the illustrated embodiment, the edges of the flange portion 22, including the wings 60, are spaced inwardly from the edges of the paperboard a sufficient distance to allow adequate adhesion between the panels 50 and 52 around the corresponding portion of the perimeter of the package 10. In this embodiment, the flange portion 22 is configured to allow sufficient adhesion between the panels 50 and 52 around the periphery of the package 10. The amount of surface area in contact between panel 50 and panel 52 will affect the strength of the adhesion between the panels. By increasing the area of contact, the bond between the panels 50 and 52 can be increased. This will not only help to hold the panels 50 and 52 together, but if the area of contact is increased in the path along which the flange portion 22 must be moved to remove it from between the panels, then it will also help to retain the flange portion 22. As a result, the size, shape and configuration of the notches 62 and the wings 60 may vary from application to application to provide an appropriate balance between various factors, such as strength of the flange portion 22, retention of the flange portion 22 between the panels 50 and 52, and adhesion between the panels 50 and 52.

As noted above, the door portion 18 and the flange portion 22 can be integrally formed. The integrally formed plastic component 12 can be thermoformed or formed in any other suitable manufacturing process in one piece, such as from a single, one-sided die. Alternatively, the door portion 18 and the flange portion 22 may separately formed and joined by a component that forms the hinge 22. For example, the door portion 18 and the flange portion 22 may be separately formed and joined by a tape (not shown) or other form of flexible material.

The plastic component 12 may be injection molded or thermoformed, and is typically constructed from polyvinyl chloride (PVC) or polyethylene terephthalate (PET) or some other polymer. Although the material is typically transparent, translucent or clear, the stock may also be opaque, clouded or tinted any suitable color in some applications. The plastic component 12 will vary in thickness from application to application. For standard applications, the plastic component 12 is likely to have a thickness ranging between 12 and 30 gauge (i.e., 12 to 30 thousands of an inch).

In the illustrated embodiment, the package 10 includes a tray 20 that cooperates with the plastic component 12 to form a cavity 13 for containing the packaged article(s). The tray 20 of the illustrated embodiment is configured to interfit with the tray panel 52. More specifically, the tray 20 generally includes a body portion 16 and a peripheral lip 30. The body portion 16 is configured to be closely fitted through a tray opening 58 in the tray panel 52. The body portion 16 forms a pocket 28 that is of sufficient size to receive the article(s) to be packaged, as well as the shoulder 24 of the door portion 18. The body portion 16 may be shaped to form one or more receptacles capable of receiving one or more loose articles. Alternatively, it may be shaped to match the contours of the article(s) to be packaged. The lip 30 is configured to be larger than the tray opening 58 so that it can be trapped between the door panel 50 and the tray panel 52 to hold the tray 20 in place within the package 10. In the illustrated embodiment, the lip 30 extends along a plane generally parallel to the tray panel 52 so that is can be readily trapped between the panels 50, 52. The width of the lip 30 may be generally uniform around the periphery of the tray, or the width may vary. The width of the lip 30 may vary from application to application. In some cases, the width of the lip 30 may be selected to be the minimize width needed to provide a sufficient connection between the tray 20 and the panels 50, 52. For example, when the panels 50, 52 are joined by a cohesive, a smaller lip 30 provide more surface area to bond between the panels 50, 52.

The tray 20 may be manufactured from a wide variety of materials. For example, the tray 20 may be manufactured from fully or partially recycled materials, such as a paper pulp material that is made at least in part from waste paper and is biodegradable. The tray 20 may be formed by molding pulp, such as wood pulp or other natural fiber pulp, into the desired shape. In the illustrated embodiment, the tray 20 is manufactured from molded pulp containing 100% recycled materials. Suitable molded pulp trays are available from a variety of well-known suppliers, such as Molded Fiber of 1521 Windsor Drive, Clinton, Iowa, and Be Green Packaging LLC of 121 West De La Guerra Street, Santa Barbara, Calif. The use of less plastic in the package 10 may reduce its environmental impact. Although the package 10 is well-suited for use with a tray formed from a paper pulp material, the tray 20 may be manufactured from other materials, such as plastic, when desired. For example, the tray 20 may be thermoformed from a suitable plastic material, such as PVC or PET.

Figure 8:
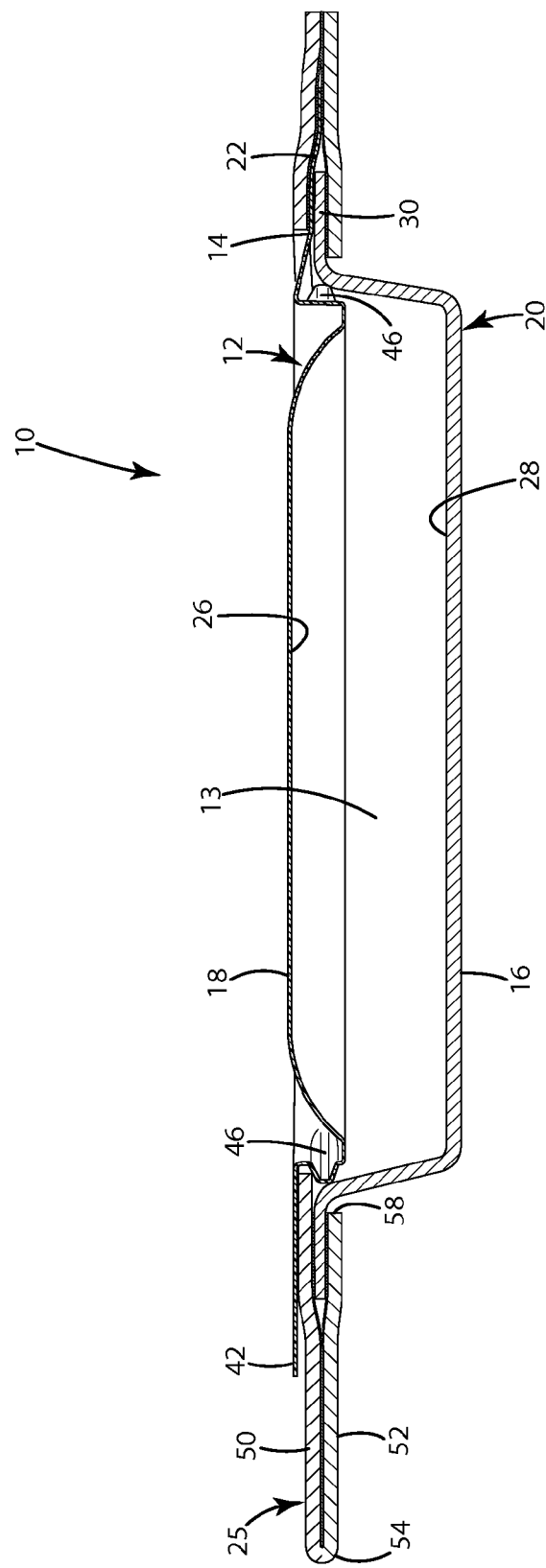
FIG. 8 is an enlarged section view of the package taken along line 8-8 of FIG. 1.
Figure 9:
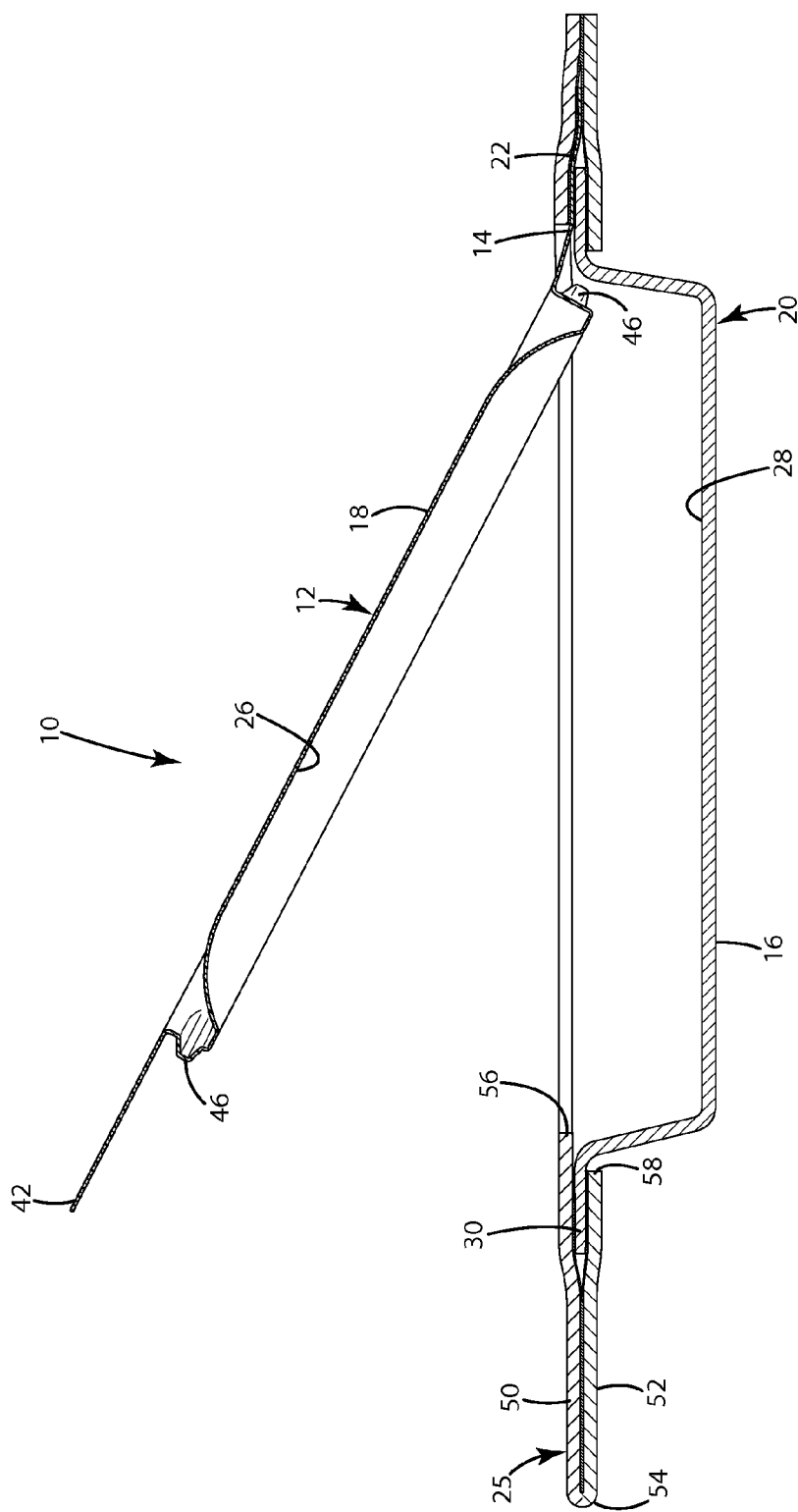
FIG. 9 is an enlarged view of the package taken along line 9-9 of FIG. 2.

As noted above, the pocket 28 of the tray 20 combines with the pocket 26 of the door portion 18 to form cavity 13. The depth of the respective pockets 26, 28 may be the same or may vary. For example, as shown in FIG. 8, the pockets 26, 28 may be substantially the same depth. In the illustrated embodiment, the door portion pocket 26 is relatively shallow and its floor extends along roughly the same plane as the door panel 50. The tray pocket 28 show in FIG. 8 is of sufficient depth to receive the shoulder 24 of the door portion 18. The depth of either or both pockets 26, 28 could, however, be increased to provide additional space in the cavity 13 for receiving the packaged article(s). Optionally, the pocket 26 may have a standard depth for a variety of applications, with the depth of the pocket 28 varying to accommodate differently sized articles. For example, if the door panel 50 is on the front side of the package 10, then maintaining a constant depth for pocket 26 may result in a largely standard appearance when viewing packages from the front at the point of sale. Although not shown, the pocket 26 in the door portion 18 and/or the pocket 28 in the tray 20 can be shaped to cradle the article(s) being packaged. For example, when it is desirable for the tray 20 and/or door portion 18 to cradle the packaged article(s), the tray 20 and/or door portion 18 can be shaped to match the interfacing contours of the packaged article(s).

Once opened, the door portion 18 can pivot away from the tray 20 as far as necessary to create an opening through which the article(s) in the package 10 can be inserted and removed. For example, the door portion 18 may pivot far enough away from the tray first part 18 so that a user can access and remove an article such as a cellular phone case or MP3 player from the cavity 13 of the package 10. As shown in FIG. 1, the hinge 14 may be exposed (e.g. not beneath the front panel 50 to allow the plastic component 12 to be opened and closed repeatedly about the hinge 14 without interference from the front panel 50.

As noted above, the paperboard portion 25 includes two panels 50 and 52 that are, among other things, adapted to retain the plastic component 12 and the tray 20. The panels 50 and 52 also provide a surface that can receive printed material, such as text and images. In the illustrated embodiment, the paperboard portion 25 includes a door panel 50 and a tray panel 52, which are adapted to sandwich the lip of the tray 20 and the flange portion of the plastic component 12. The door and tray panels 50, 52 may sandwich the entire peripheral lip 30 of the tray 20, as shown, or some smaller portion of the lip 30 as desired. The door and tray panels 50, 52 may be secured together and/or to the flange portion 22 in any suitable manner, including adhesives known in the art. For example, the panels 50, 52 can be secured with a rubber or latex cohesive. However, any suitable adhesive, connector or fastener may (alone or in combination) be used to join the panels 50, 52 and the flange portion 22. The panels 50, 52 can be any desired size and shape depending on any number of relevant factors, such as desired aesthetics and the characteristics of the article (s) to be packaged (e.g. number, size, shape and weight). The paperboard portion 25 can be constructed out of paperboard material. However, other materials commonly known in the art, such as plastic, may also be used to form the door panel and tray panel.

Figure 7:
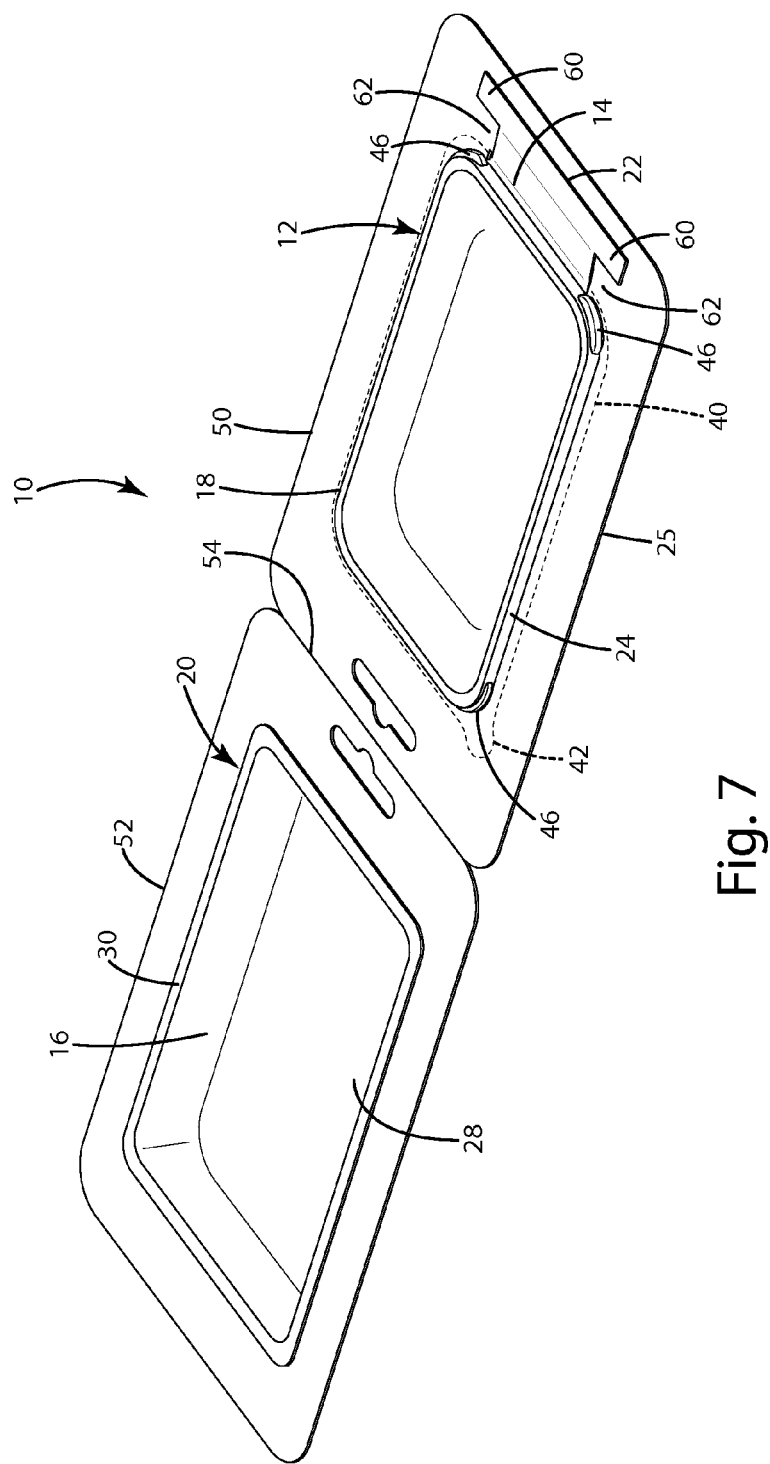
FIG. 7 is a perspective view showing the plastic component and the tray on the open panels.

In the illustrated embodiment, the door and tray panels 50, 52 are integrally formed from a single piece of paperboard. For example, as shown in FIG. 7, the panels 50, 52 are integrally formed and are adapted to be folded along a fold line 54, such as a score line, a partial cut line, a row of perforations, or the like. In another embodiment, the panels 50, 52 may be separate pieces that are joined together after being closed together about the door portion 18 and tray 20.

Figure 4:
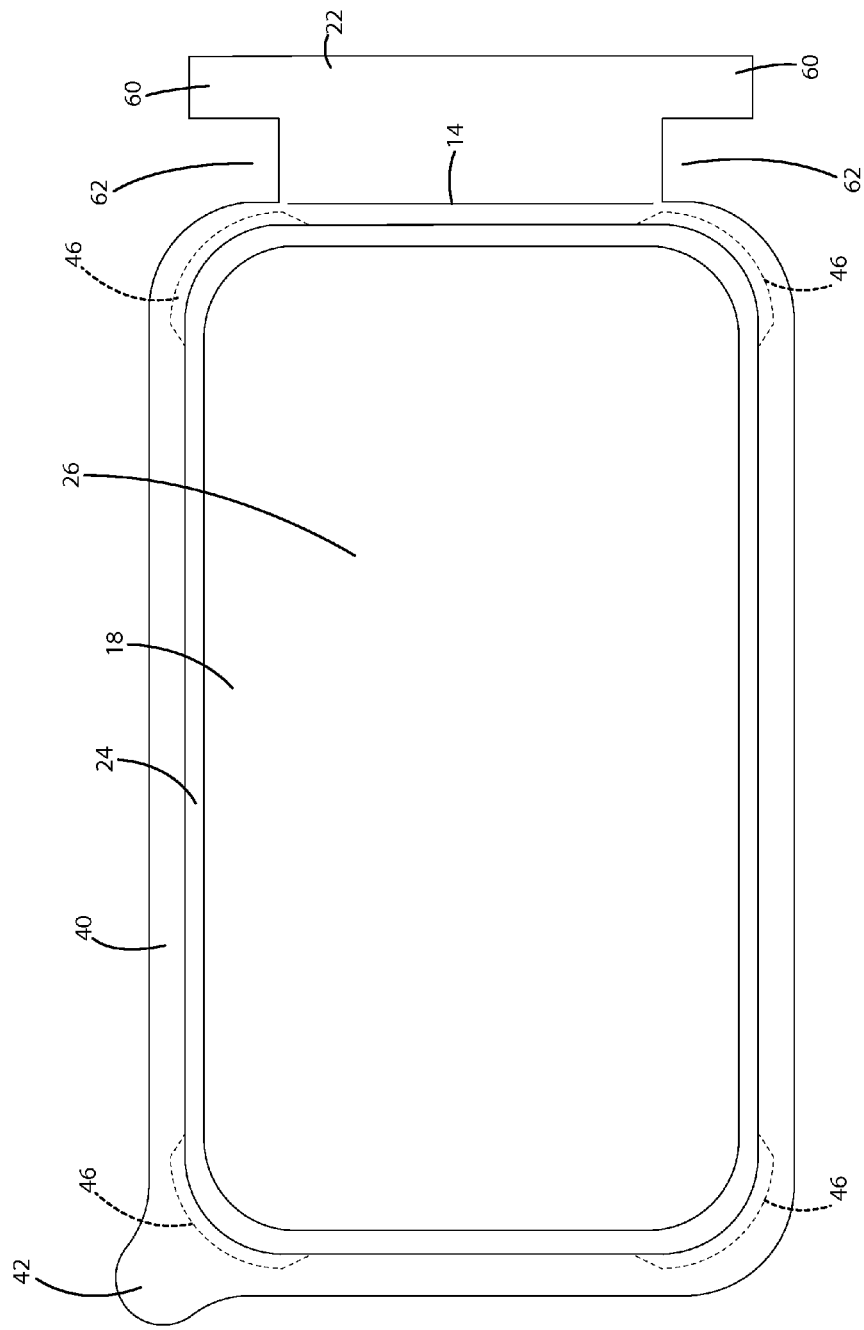
FIG. 4 is top plan view of the plastic component.
Figure 5:
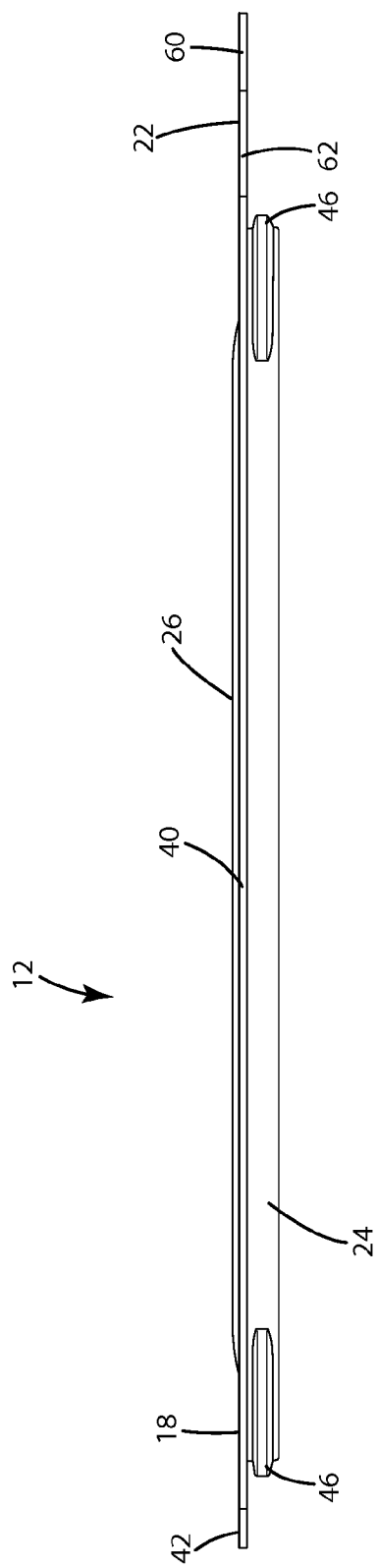
FIG. 5 is a side view of the plastic component.
Figure 6:
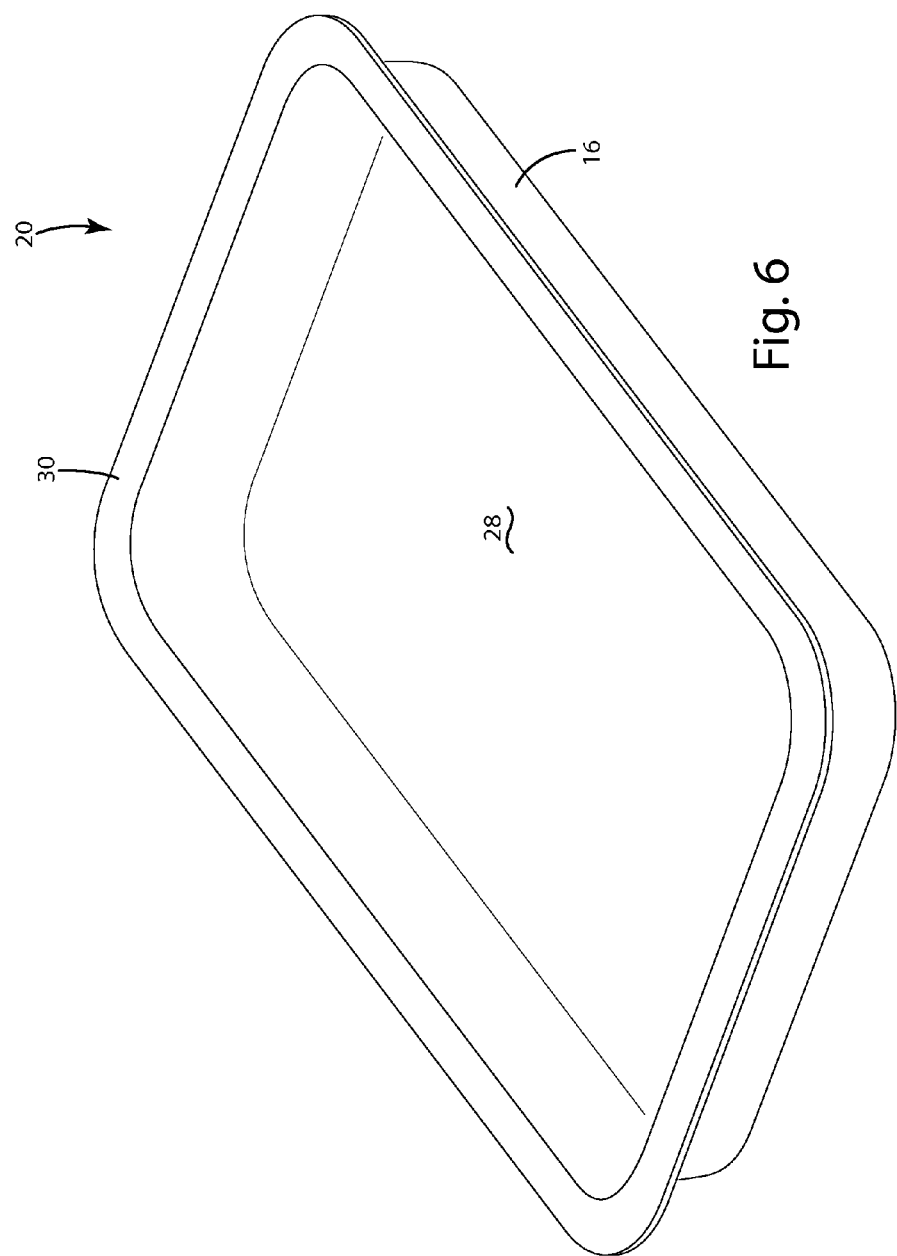
FIG. 6 is a perspective view of the tray.

In this embodiment, the fold line 54 forms the upper peripheral edge 54 of the package 10 (FIG. 4). In the illustrated embodiment, the door panel 50 defines a door opening 56 configured to closely receive the door portion 18 so that the door portion 18 snap-locks with the door panel 50 when closed. In the illustrated embodiment, the door opening 56 is size and shaped to snap-lock with the snap elements 46 on the shoulder 24 of the door portion 18. As noted above, the snap elements 46 and door opening 56 may be configured so that the snap-lock occurs at the corners of the door portion 18. In this embodiment, the snap elements 46 engage the curved corner portions of the door opening 56. The curved shape at the interface may provide a stiffer and more stable interaction between the door portion 18 and door panel 50. It may also stand up to repeated opening and closing better than might be expected with snap elements interfacing with straight edges of the door panel 50. The door opening 56 may include a hinge notch 57 that exposes the hinge 14, thereby allowing the door portion 18 to swing freely without interference from the door panel 50. The hinge 14 may alternatively be hidden beneath the door panel 50 or it may be positioned so that it is exposed without the notch 57 (e.g. it may be positioned within the periphery of the door opening 56.

In this embodiment, the tray panel 52 includes a tray opening 58. The tray opening 56 can be selectively sized and shaped to accommodate the tray 20 and can be selectively positioned so that the pocket 28 of the tray 20 and the pocket 26 of the door portion 18 are generally aligned when the paperboard portion 24 is folded.

Although the panels 50 and 52 of the illustrated embodiment are generally rectangular, they may vary from application to application as desired. For example, the general shape of the panels 50 and 52 may varied depending on the shape of the article(s) to be packaged or on the desired package aesthetics. Similarly, the door portion 18 and the tray 20 are generally rectangular in the illustrated embodiment, but may vary from application to application as desired. The number of door portions and trays may also vary from application to application, as desired. For example, a single package may be provided with two separate trays and either a single door portion configured to cover both trays or two separate door portions configured to separately cover the two trays.

The panels 50 and 52 may include a hang hole 44 that allows the package 10 to be easily hung, for example, from a display hook at the point of sale. The hang hole 44 may vary in size, shape, configuration and location, or it may be eliminated when unnecessary. In the illustrated embodiment, separate openings are defined in the door panel 50 and the tray panel 52. These openings align to form the hang hole 44 when the paperboard portion 25 is closed about fold line 54. The package 10 may be provided with other package features, as desired, such as functional and/or aesthetic features selected to tailor the package for specific applications. For example, the package 10 may be provided with a foot to help it stand upright, a "touch and feel" hole that allows a user to touch and feel the packaged article(s) or any of a wide range of features that might be provided for branding purposes.

To assemble the package 10, the plastic component 12, tray 20 and panels 50, 52 are separately manufactured. Each of these components may be manufactured using conventional techniques and apparatus. The flange portion 22 of the plastic component 12 may be inserted through the door opening 56 from what will be the outside of the door panel 50 when the package 10 is sealed. The plastic component 12 is further inserted into the door opening 56 until the shoulder 24 is closely received within the door opening 56. The door portion 18 can be pressed downward into the door opening 56 until the snap elements 46 engage and pass beyond the edge of the door panel 50 defining the door opening 56. The interaction between the snap elements 46 and door panel 50 provides a snap lock that helps to hold the door portion 18 in the closed position. The plastic component 12 is inserted until the peripheral lip 40 engages the outer surface of door panel 50. As noted above, the door panel 50 may include a hinge notch 57. If so, the plastic component 12 may be situated so that the hinge 14 is disposed in the notch 57. If there is no hinge notch 57, the hinge 14 may be positioned under the door panel 50 or may be exposed within the periphery of the door opening 56.

The tray 20 may be installed in the tray panel 52 before or after the plastic component 12 is installed in the door panel 50. The tray 20 is inserted into the tray opening 58. More specifically, the body portion 16 is fitted into the tray opening 58 from what will become the inside of the tray panel 52 when the package 10 is sealed. The tray 20 is pushed into the tray opening 58 until the peripheral lip 30 engages the inside surface of the tray panel 52.

Once the plastic component 12 and tray 20 are installed in the panels 50, 52, the paperboard portion 24 is closed to sandwich the flange portion 22 of the plastic component 12 and the peripheral lip 30 of the tray 20. In the illustrated embodiment, the door panel 50 and tray panel 52 are joined along fold line 54 and the paperboard portion 24 is closed by pivoting the door panel 50 and tray panel 52 together about the fold line 54. The door panel 50 and tray panel 52 may be joined together by cement, adhesive or other mechanisms. In the illustrated embodiment, the entire inner surfaces of the door panel 50 and tray panel 52 are coated with a cohesive. When the inner surfaces of the two panels 50, 52 are brought into contact, they adhere to one another. The adhesion between the panels 50, 52 also holds the flange portion 22, including wings 60 to resist removal of the flange portion 22 from between the panels 50, 52. Alternatively, the panels 50, 52 may be joined by other cements or adhesives, such as heat activated adhesive, heat seal coating, standard glue, hot melt glue, single-sided tape, double-sided tape or an RF adhesive. If it is desirable to use single-sided tape, one method of doing so may be to tape the flange portion 22 to one of the panels 50, 52, and to tape the panels 50, 52 together with tape applied around the outside of the panels 50, 52. As another alternative (or in addition), the panels 50, 52 may be joined by mechanical structures, such as staples, rivets, grommets, push-lock pins or crimping. With embodiments that include a mechanical structure, the mechanical structure may extend through the flange portion 22 to mechanically secured the flange portion 22 with respect to the panels 50, 52. For example, the plastic component 12 may be secured by a staple extending through the flange portion 22 and one or both of the panels 50, 52. Additional methods for joining the panels 50, 52 may be available with specific panel materials. For example, if the panels 50, 52 are manufactured from plastic, they may be joined using ultrasonic or RF methods. Some alternative adhesives may adhere directly to the flange portion 22 and may therefore improve the bond between the panels 50, 52 and the flange portion 22. Although the entire inner surfaces of the panels 50, 52 are covered with adhesive in the illustrated embodiment, they may be partially coated in some applications. For example, in some applications, adhesive may be applied only along the peripheral edges of the panels 50, 52 or in select locations as desired to provide a suitable bond between the panels 50, 52 and flange portion 22.

In another aspect, a method is provided for forming a package, such as the package 10 described above. The method includes the steps of: (a) forming a plastic component 12 with a hinge 14 adapted to divide the plastic component into a door portion 18 and a flange portion 22; (b) forming a tray 20 separately from the plastic component 12; (c) forming a door panel 50 with a door opening 56 to receive the plastic component 12; (d) forming a tray panel 52 with a tray opening 58 to receive the tray 20; (e) inserting the flange portion 22 and the door portion into the door opening 56; (f) inserting the tray 20 into the tray opening 58; (g) joining the door panel 50 and the tray panel 52 to trap the flange portion 22 and the tray 20, the door portion 18 and tray 20 cooperatively defining an article containing cavity and (h) selectively pivoting the door portion 18 about the hinge 14 to open and close the package 10.

In one embodiment, the step of forming the plastic component 12 can include placing a piece of sheet stock in a mold and thermoforming the clamshell. The molding or thermoforming step can include forming a pocket in the door portion 18 and wings 60 on the flange portion 22. This step can also include (a) forming the door portion 18 with a shoulder 24 that includes one or more snap elements 46 configured to snap into engagement with an edge of the door panel 50. The shoulder 24 may include four snap elements 46 configured to engage the door panel 50 at or near the corners. The door panel 50 may optionally be formed with a hinge notch 57 that exposes the hinge 14 and therefore may reduce the likelihood that the door panel 50 will be damaged by repeated opening and closing of the door portion 18.

Optionally, the step of joining the door panel 50 and tray panel 52 may include securing the door panel 50 and the tray panel 52 together using a cohesive. A layer of cohesive may be applied to the inside surfaces of each of the door panel 50 and the tray panel 52. The inside surfaces of the two panels 50, 52 may be closed against each other to bring the layers of cohesive into contact, thereby joining the panels.

Figure 10:
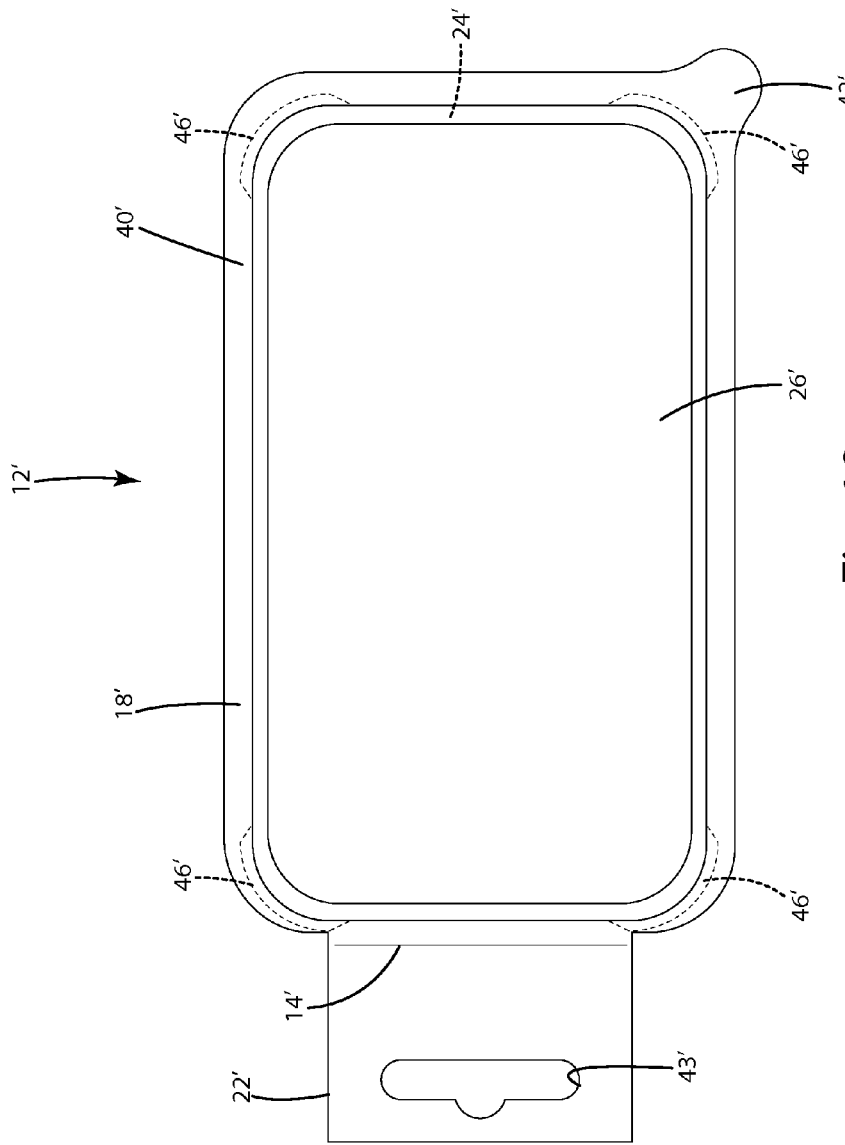
FIG. 10 is top plan view of a first alternative plastic component.
Figure 11:
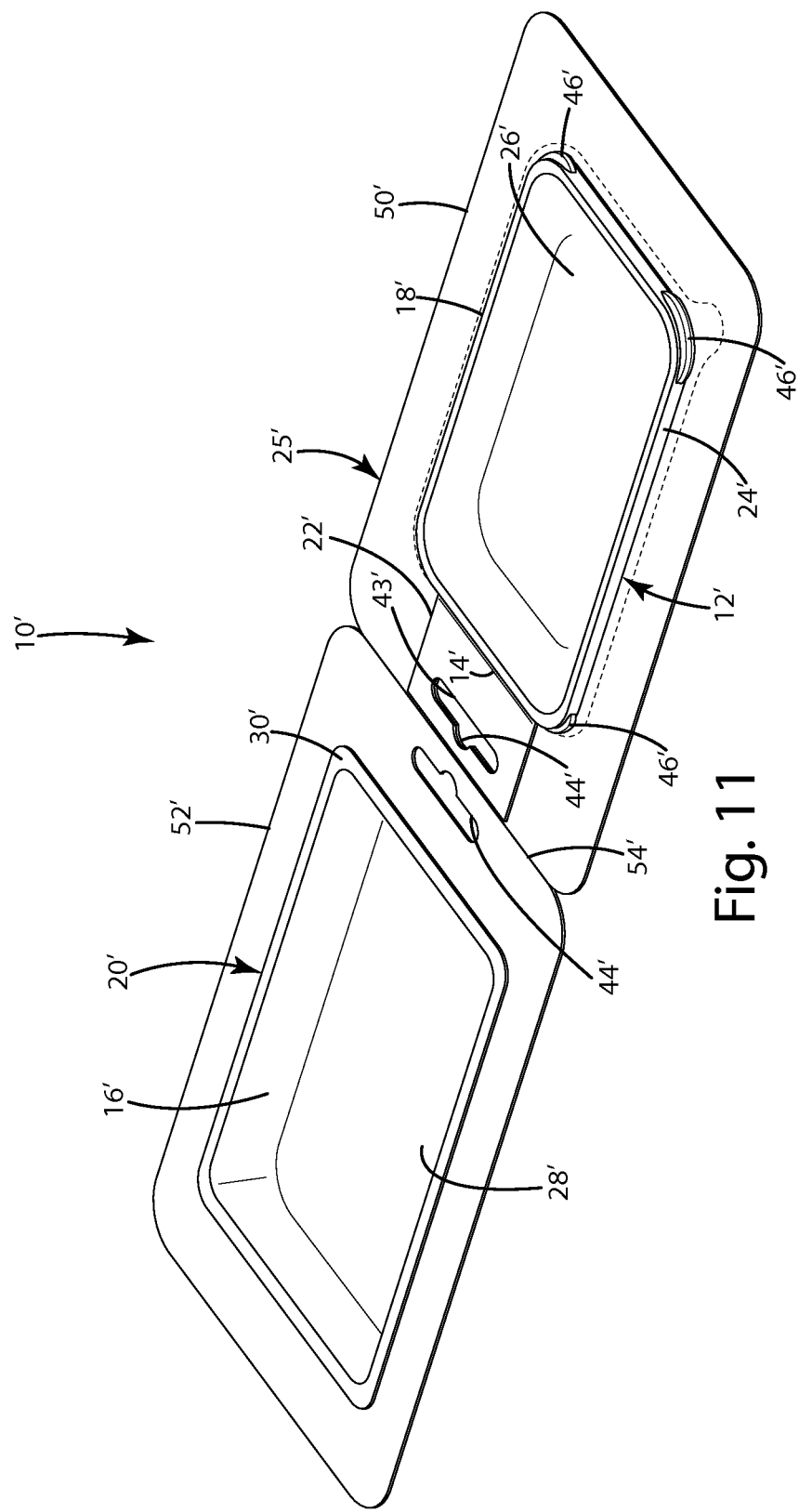
FIG. 11 is a perspective view showing the first alternative plastic component on the open panels.

In an alternative embodiment shown in FIGS. 10-11, the package 10' includes a plastic component 12' with a flange portion 22' that extends into the region of the hang hole 44'. Except as otherwise described and shown in FIGS. 10-11, this embodiment is generally identical to package 10 described above and FIGS. 10-11 include reference numerals that correspond with those of FIGS. 1-9 except that they are denoted with a prime symbol ("'"). In this embodiment, the flange portion 22' defines an opening 43' that corresponds with and reinforces the hang hole 44'. Given that the flange portion 22' in this embodiment is relatively large, the flange portion 22' of the illustrated embodiment does not include wings to assist in holding the flange portion 22' between the panels 50' and 52'. The flange portion 22' may, however, include wings (not shown) or other variations in shape that will assist in retaining the flange portion 22' between the panels 50 and 52. The door panel 50' of this embodiment does not include a hinge notch; however, a hinge notch could be added if desired.

Figure 12:
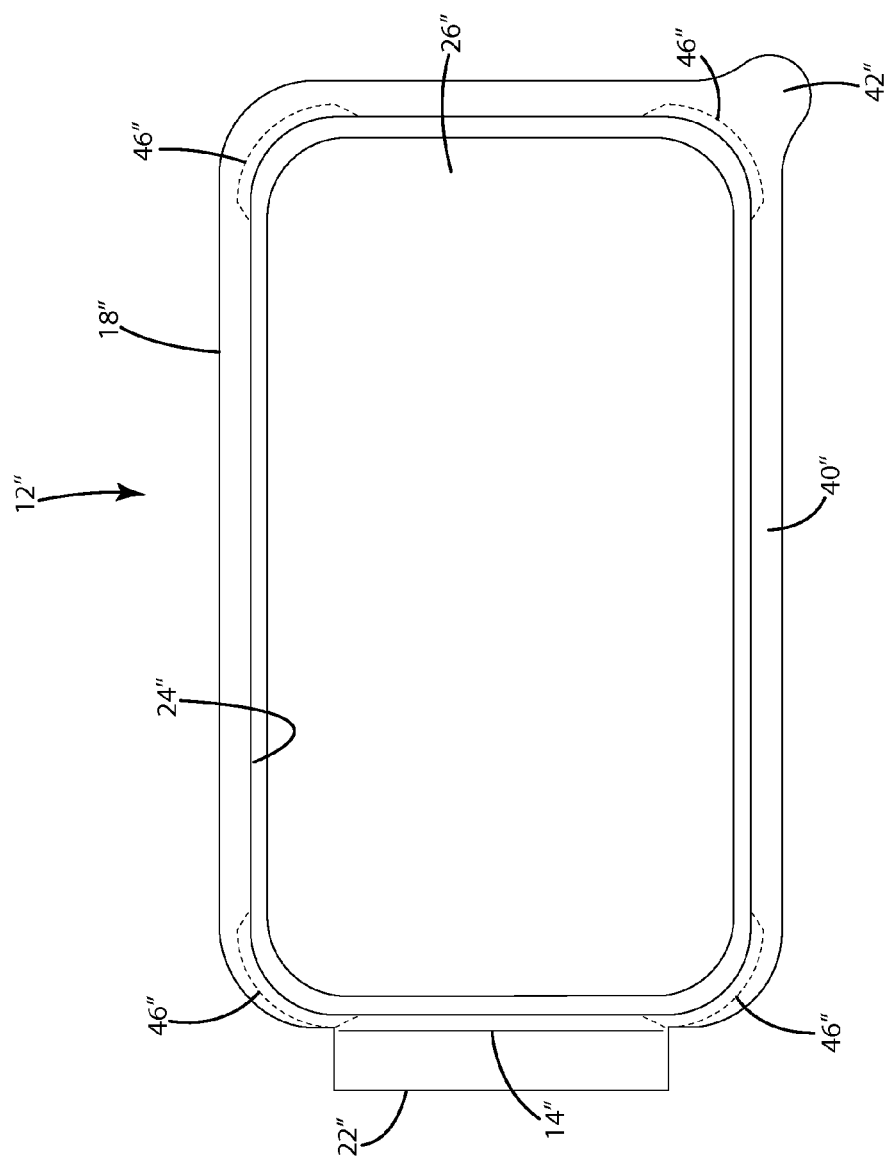
FIG. 12 is a top plan view of a second alternative plastic component.
Figure 13:
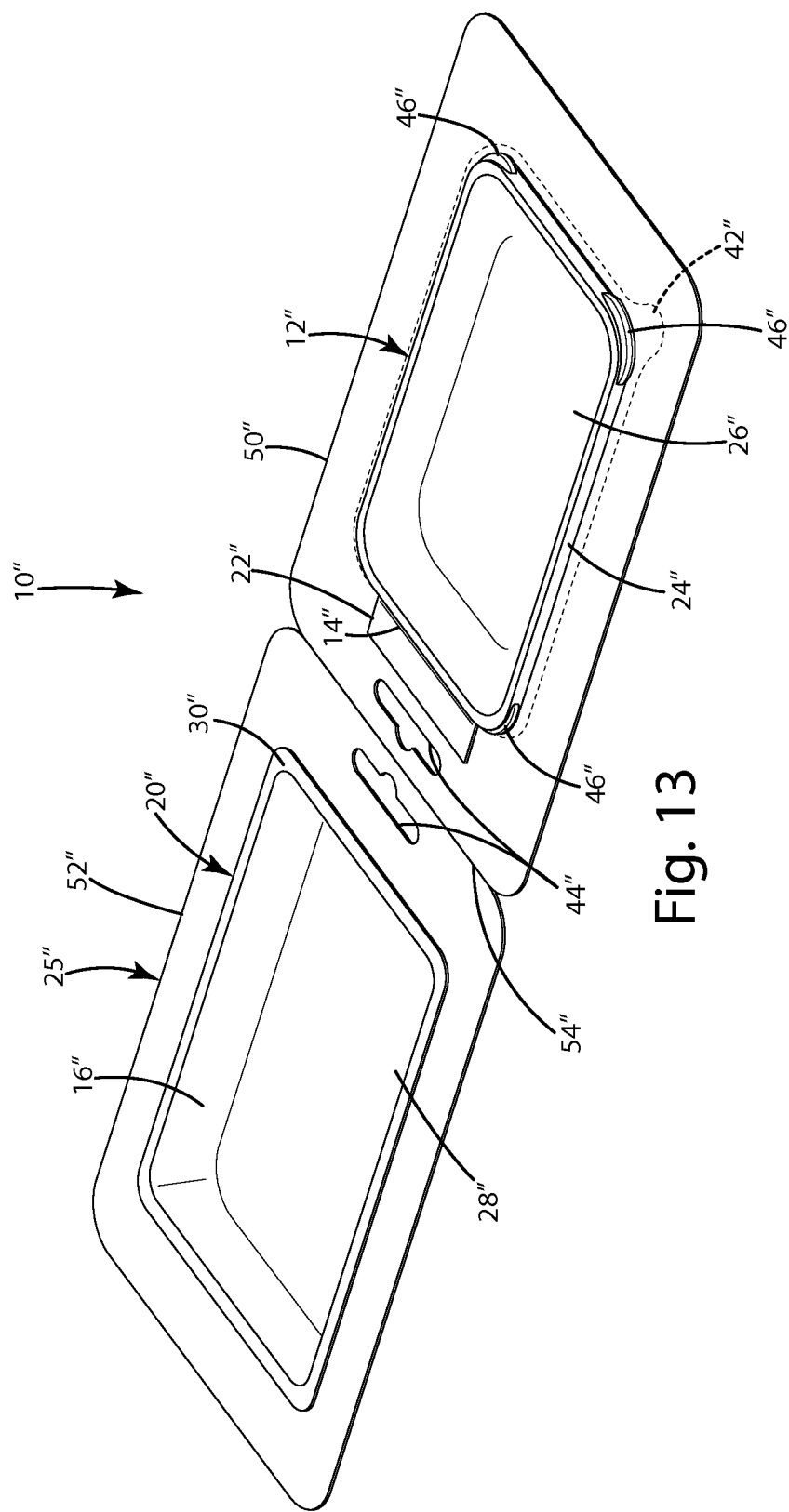
FIG. 13 is a perspective view showing the second alternative plastic component on the open panels.

Another alternative embodiment is shown in FIGS. 12-13. In this embodiment, the package 10" includes a plastic component 12" with an alternative flange portion 22". Except as otherwise described and shown in FIGS. 12-13, this embodiment is generally identical to package 10 described above and FIGS. 12-13 include reference numerals that correspond with those of FIGS. 1-9 except that they are denoted with a double prime symbol ("''"). The package 10" of this embodiment is configured primarily for use in applications in which the door panel 50" and tray panel 52" are joined by cement or an adhesive that bonds directly to the flange portion 22". With a sufficiently strong bond between the panels 50" and 52" and the flange portion 22", the flange portion 22" can be significantly smaller than shown in previous embodiments. This may reduce the amount of plastic used in the package 10" and provide the associated benefits. In the illustrated embodiment, the inner or inside surfaces of both the door panel 50" and tray panel 52" may be entirely covered with an appropriate cement or adhesive. For example, the panels may be coated with a heat-activated adhesive that can be used to join the panels 50", 52" and the flange portion 22". The flange portion 22" of this embodiment is merely exemplary and the flange portion 22" may vary in size, shape and configuration, as desired to provide appropriate strength in the connection between the plastic component 12" and the paperboard component 25".

Figure 14:
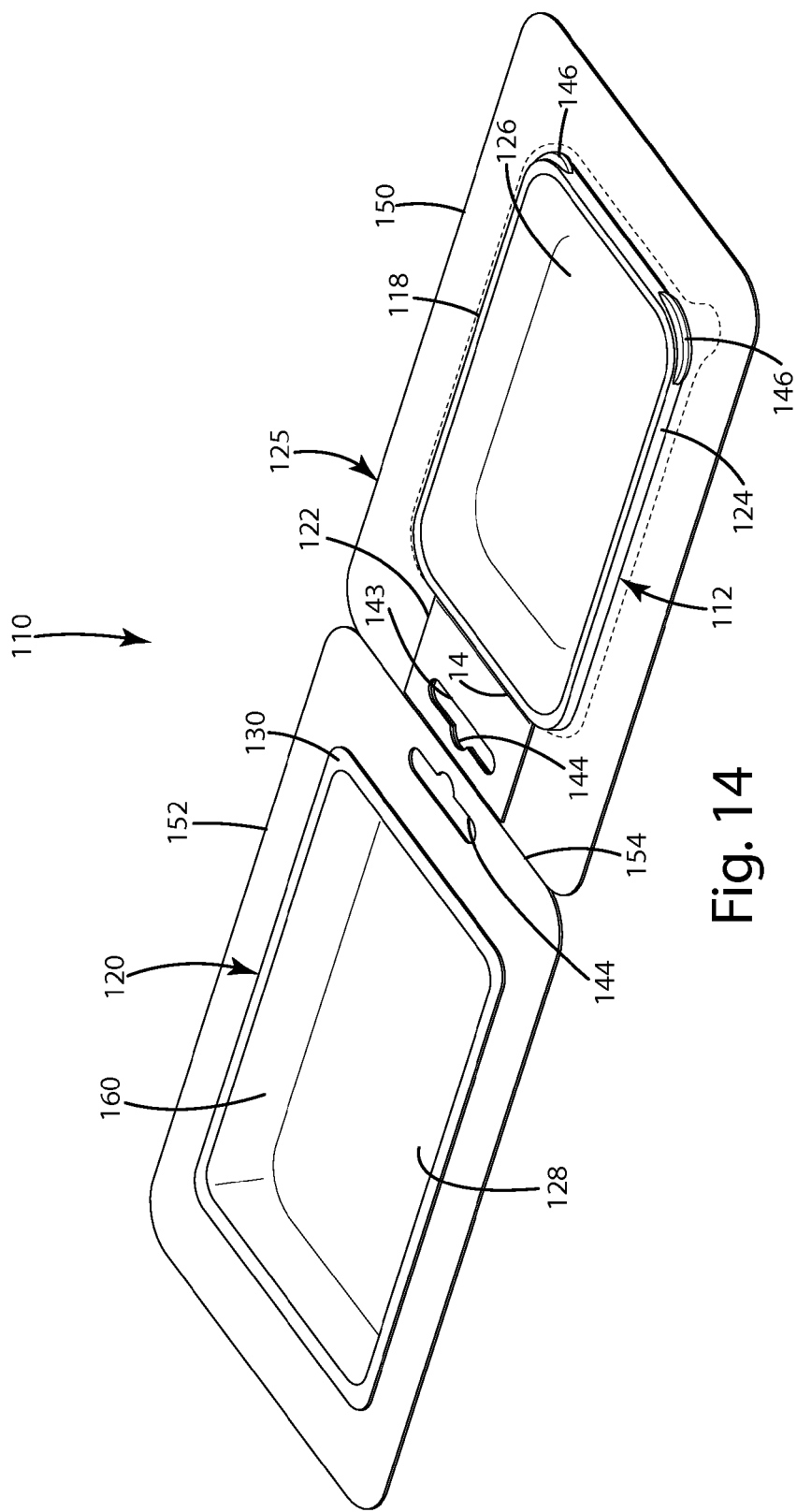
FIG. 14 is a perspective view of a package showing a third alternative plastic component on open panels.

As noted above, the number of snap elements in the door portion may vary from application to application. An alternative embodiment illustrating this is shown in FIG. 14. The package 110 of FIG. 14 is essentially identical to the package of FIGS. 10-11, except that the plastic component 112 of FIG. 14 includes a different number of snap elements 146 than the plastic component 12' of FIGS. 10-11. In view of the similarity, FIG. 14 includes reference numerals that correspond with those of FIGS. 10-11, except that the prime symbols ("'") are deleted and each reference numeral is preceded with a "1" in the hundreds digit (e.g. reference numeral 10' of FIGS. 10 and 11 corresponds to reference numeral 110 in FIG. 14). In this embodiment, the plastic component 112 includes two (rather than four) snap elements 146. As shown, the two snap elements 146 of this embodiment are located in the "free" corners of the door portion 118 (i.e. the corners opposite the flange portion 122). Although these two snap elements 146 are positioned in the free corners of the door portion 118, their location may vary from application to application, if desired.

Figure 15:
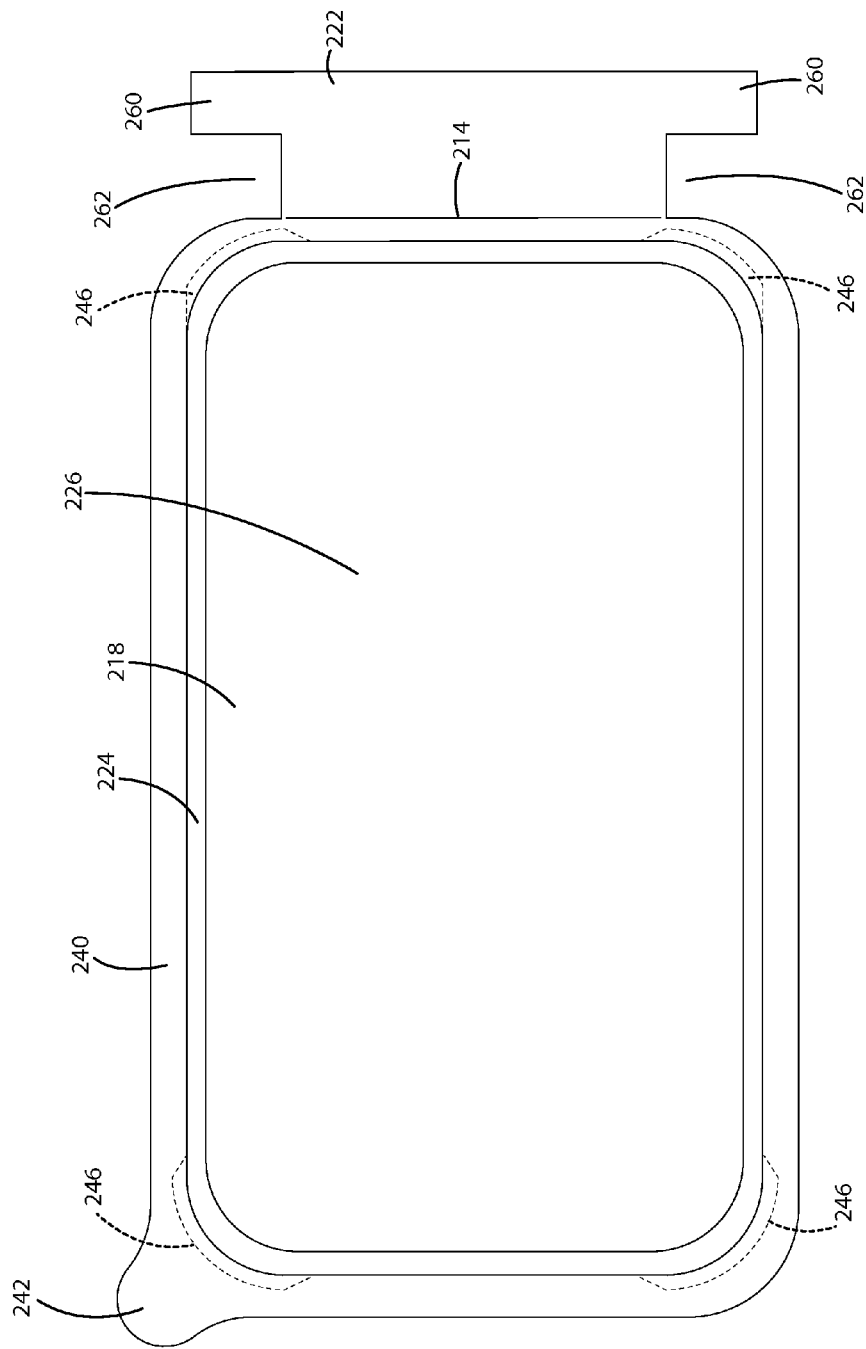
FIG. 15 is a top plan view of a fourth alternative plastic component.

The configuration of the snap elements may also vary from application to application. For example, FIG. 15 shows an alternative embodiment of the plastic component 212 in which the snap elements 246 located adjacent the flange portion 222 have an alternate configuration. Except for the revised snap elements 246, the plastic component 212 of FIG. 15 is essentially identical to the plastic component of FIG. 4. Accordingly, FIG. 15 includes reference numerals that correspond with those of FIG. 4, except that each reference numeral is preceded with a "2" in the hundreds digit (e.g. reference numeral 26 of FIG. 4 corresponds to reference numeral 226 in FIG. 15). In this alternative embodiment, the snap elements 246 adjacent the flange portion 222 are configured so that they do not snap-lock when closed, but will catch under the door panel to resist lifting of the closed door portion 218 away from the tray adjacent the hinge 214. More specifically, the snap elements 246 adjacent the flange portion 222 may be shortened so that their outer end walls do not extend beyond the shoulder 224 on the sides of the door portion 218. In this embodiment, the outer end walls of these two snap elements 246 are substantially aligned with and parallel to the outer edge of corresponding side portions of the shoulder 224. As a result, those snap-elements 246 clear the door panel without interference as the door portion 218 is opened and closed. Although the modified snap elements do not snap-lock with the door panel, the pivotal movement of the door portion 218 causes them to move into a position under the door panel as the door portion 218 is closed. As a result, when the door portion 218 is closed, the modified snap elements 246 catch under the door panel to resist upward movement of the door portion 218 with respect to the door panel.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are as follows:

1. A package for packaging an article comprising:
a tray with a peripheral lip;
a plastic component having a door portion;
a flange portion and a hinge; and
a door panel and a tray panel, the tray panel defining a tray opening receiving the tray, the door panel defining a door opening selectively receiving the door portion, the door panel and the tray panel sandwiching the peripheral lip of the tray and the flange portion of the plastic component wherein the door portion is selectively movable between an open position and a closed position by pivoting the door portion about the hinge, the door portion and the door panel configured to interact to selectively interlock the door portion in the closed position,
wherein the tray is molded from a recycled paper product.

2. The package of claim 1 wherein the door portion includes a shoulder configured to be closely fitted into the door opening when the door portion is in the closed position,
wherein the shoulder includes one or more snap elements configured to create an interference fit between the door portion and the door panel.

3. The package of claim 2 wherein the door portion includes first and second free corners disposed opposite the hinge, the shoulder including a first snap element extending into the first free corner and a second snap element extending into the second free corner.

4. The package of claim 2 wherein the tray defines a pocket of sufficient size to receive the shoulder of the door portion, the shoulder extending through that door panel and the tray panel into the pocket of the tray.

5. The package of claim 2 wherein the door portion includes a lip engaging a surface of the door panel when the door portion is in the closed position, the lip and the one or more snap elements being disposed on opposite sides of the door panel when the door portion is in the closed position.

6. The package of claim 5 wherein the door panel, the tray panel and the flange portion of the plastic component cooperatively define a hang hole.

7. A package for packaging an article comprising:
a door component with a door portion and a flange portion, the door portion integrally formed with and joined to the flange portion along a hinge, the hinge allowing the door portion to be selectively pivotable about the hinge between an open position and a closed position;
a tray having a body portion and a peripheral lip extending around at least a portion of the body portion; and
a paperboard component having a door panel and a tray panel, the door panel defining a door opening, the flange portion secured between the door panel and the tray panel, the door portion selectively fittable into the door opening when in the closed position and removable from within the door opening when in the open position, the door portion interlocking with the door panel to retain the door portion in the closed position.

8. The package of claim 7 wherein the door component is a thermoformed plastic.

9. The package of claim 8 wherein the door component includes a shoulder configured to be fitted within the door opening.

10. The package of claim 9 wherein the shoulder includes snap elements configured to interface with the door panel to retain the door portion in the closed position.

11. The package of claim 10 wherein an edge of the door panel defining the door opening includes first and second inside corners, the door portion including a first snap element to interface with the first inside corner and a second snap element to interface with the second inside corner.

12. The package of claim 11 wherein the body portion defines a pocket configured to receive the shoulder when the door portion is closed.

13. A method for forming a package comprising the steps of:
forming a door component with a door portion and flange portion joined along a hinge, the door portion having a peripheral lip extending around at least a portion of the periphery of the door portion;
forming a tray with a main body and a peripheral lip extending around at least a portion of the main body, the main body defining a pocket;
forming a paperboard component with a door panel and a tray panel, the door panel defining a door opening and the tray panel defining a tray opening, the tray panel and the door panel each having an inner surface and an outer surface; positioning the tray in the tray panel with the tray peripheral lip engaging the inner surface of the tray panel;
inserting the door component into the door opening with the flange portion engaging the inner surface of the door panel and the door peripheral lip engaging the outer surface of the door panel;
closing the paperboard component bringing the inner surface of the door panel into engagement with the inner surface of the tray panel to entrap the tray peripheral lip and the flange portion; and
selectively pivoting the door portion between open and closed positions by pivoting the door portion about the hinge, the door portion interfacing with the door panel to resist movement of the door portion between the open position and the closed position,
wherein the forming a door component step includes forming the door component with a shoulder configured to pass through the door opening and the tray opening into the pocket, and
wherein the forming a door component step includes forming at least one snap element on the shoulder, the snap element configured to have an interference fit with an edge of the door panel, the interference fit resisting movement of the door portion between the open position and the closed position.

14. A method for forming a package comprising the steps of:
forming a door component with a door portion and flange portion joined along a hinge, the door portion having a peripheral lip extending around at least a portion of the periphery of the door portion;

forming a tray with a main body and a peripheral lip extending around at least a portion of the main body, the main body defining a pocket;

forming a paperboard component with a door panel and a tray panel, the door panel defining a door opening and the tray panel defining a tray opening, the tray panel and the door panel each having an inner surface and an outer surface; positioning the tray in the tray panel with the tray peripheral lip engaging the inner surface of the tray panel;

inserting the door component into the door opening with the flange portion engaging the inner surface of the door panel and the door peripheral lip engaging the outer surface of the door panel;

closing the paperboard component bringing the inner surface of the door panel into engagement with the inner surface of the tray panel to entrap the tray peripheral lip and the flange portion; and selectively pivoting the door portion between open and closed positions by pivoting the door portion about the hinge, the door portion interfacing with the door panel to resist movement of the door portion between the open position and the closed position, wherein the door panel opening is generally rectangular with four corners; and the forming a door component step includes forming at least one snap element on the shoulder, the at least one snap element configured to have an interference fit with an edge of the door panel in each of the four corners, the interference fit resisting movement of the door portion between the open position and the closed position.

15. The method of claim 14 wherein the forming a door component step includes thermoforming the door component from plastic; and the forming a tray step includes molding the tray from a paper pulp material.

* * * * *